(12) United States Patent
Gallen et al.

(10) Patent No.: US 8,657,689 B2
(45) Date of Patent: Feb. 25, 2014

(54) ANNULAR FLOW DISTRIBUTION CONTROL OF LUBRICATION OIL BETWEEN CONCENTRIC ROTARY SHAFTS

(75) Inventors: John J. Gallen, Waterloo, IA (US); Bradley A. Merrill, Dike, IA (US); Brian Daniel Durbin, Waverly, IA (US); Chad Gregory Vandenberg, Waterloo, IA (US)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 12/999,656

(22) PCT Filed: Jul. 3, 2008

(86) PCT No.: PCT/US2008/008276
§ 371 (c)(1),
(2), (4) Date: Mar. 14, 2011

(87) PCT Pub. No.: WO2010/002369
PCT Pub. Date: Jan. 7, 2010

(65) Prior Publication Data
US 2012/0010003 A1  Jan. 12, 2012

(51) Int. Cl.
*F16C 3/00* (2006.01)
(52) U.S. Cl.
USPC .......................................................... 464/7

(58) Field of Classification Search
USPC ...................................................... 464/7–16
See application file for complete search history.

(56) References Cited

U.S. PATENT DOCUMENTS

| 4,440,118 A | 4/1984 | Stang et al. |
| 4,453,784 A | 6/1984 | Kildea et al. |
| 4,615,414 A | 10/1986 | Flores Agell |
| 4,791,269 A * | 12/1988 | McLean et al. |
| 5,019,738 A * | 5/1991 | Weilbach et al. |
| 5,375,564 A | 12/1994 | Gail |
| 5,529,027 A | 6/1996 | Okubo |
| 2003/0000772 A1 | 1/2003 | Stones |

* cited by examiner

*Primary Examiner* — Gregory Binda
(74) *Attorney, Agent, or Firm* — Quarles & Brady LLP

(57) ABSTRACT

A concentric cylinder drive assembly (1) used for the transmission of power in industrial machinery is disclosed. More specifically, a concentric drive assembly (1) with a hollow outer cylinder (5) having an internal surface with a bi-directional surface lay; an inner cylinder (3) having an external surface with a unidirectional surface lay oriented at a predetermined angle ($\phi$) along the length of the cylinder; an annular channel established between the outer and inner cylinders having a predetermined gap (7); and a lubrication oil that substantially fills the annular channel is presented.

21 Claims, 2 Drawing Sheets

ANNULAR FLOW DISTRIBUTION CONTROL OF LUBRICATION OIL BETWEEN CONCENTRIC ROTARY SHAFTS

FIELD

The present specification generally relates to industrial machinery having an internal combustion engine. More specifically, the specification relates to controlling the annular flow distribution for lubrication oil between concentric rotary shafts used to drive agricultural, construction, and forestry tractors and equipment, as well as any mechanical implements, tools, or components integrated with the tractors and equipment.

BACKGROUND

Conventional industrial machinery is typically equipped with an internal combustion engine that can provide the power necessary to drive the main axle and wheel assembly or to drive external accessories and implements, such as bale presses, crop pickers, etc., through an arrangement of power take-off shafts and couplings. In many machines, power transmission is accomplished through the use of an assembly having concentric rotary cylinders or shafts. In this type of concentric cylinder drive assembly it is necessary to provide lubrication in the annular channel that is established between the inner and outer cylinders. This lubrication is normally in the form of a lubricating fluid, such as oil, fed through the hollow center of the inner cylinder. Holes drilled in the cylindrical wall of the inner cylinder along its entire length allow this lubrication oil to flow from the cylinder's hollow center to the annular channel. However, the presence of these holes increases manufacturing costs and can weaken the integrity of the inner cylinder, thereby, resulting in fatigue and premature failures. Attempts to eliminate these holes by feeding the oil directly into the annular channel from one end of the concentric cylinder drive assembly can lead to uneven distribution of the oil throughout the annular channel, thereby, accelerating wear between the rotating cylinders. There is a need in the industry to provide a means to evenly distribute oil into the annular channel between rotating concentric cylinders when used in the transmission of power for industrial machinery that is economical and can reduce the possibility of premature wear and failure.

SUMMARY

In one aspect of the present specification, a concentric cylinder drive assembly used for the transmission of power in industrial machinery is disclosed. This concentric drive assembly may have a hollow outer cylinder having an internal surface with a bi-directional surface lay; an inner cylinder having an external surface with a unidirectional surface lay oriented at a predetermined angle ($\phi$) along the length of the cylinder; an annular channel established between the outer and inner cylinders having a predetermined gap; and a lubrication oil that substantially fills the annular channel. The inner cylinder may be rotated in one direction, thereby, subjecting the lubrication oil to a laminar flow condition.

In another embodiment of the present specification, the unidirectional surface lay of the inner cylinder may be a rearward-facing lay having an angle ($\phi$) greater than about 90 degrees, a forward-facing lay with an angle ($\phi$) less than about 90 degrees, or a perpendicular-facing lay having an angle ($\phi$) of about 90 degrees.

The interior surface of the outer cylinder and the exterior surface of the inner cylinder may have an average surface roughness (Ra) with the range of about 0.5 micrometers to about 5.0 micrometers. An average surface roughness (Ra) for the interior surface of the outer cylinder is preferably selected to be between about 1.0 micrometer and about 1.6 micrometers, while an average surface roughness (Ra) between about 0.8 micrometers and 2.5 micrometers is preferred for the exterior surface of the inner cylinder.

In yet another aspect of the present specification, a concentric cylinder drive assembly used for the transmission of power may be subdivided into a forward section and a rearward section. Through both of the forward and rearward sections runs a hollow outer cylinder that has an internal surface with a bi-directional surface lay and an inner cylinder that has an external surface with a unidirectional surface lay oriented at a predetermined angle ($\phi$) along the length of the cylinder. In this embodiment, the annular channel established between the outer and inner cylinders is substantially filled with lubrication oil, which is subjected to laminar flow when the inner cylinder is rotated.

The distribution of lubrication oil between the forward and rearward sections may be determined according to a predetermined forward/rearward ($D_F/D_R$) ratio. When $D_F/D_R$ is about 0.7, the angle ($\phi$) for the unidirectional surface lay of the inner cylinder may be about 90 degrees. When the outer cylinder is rotated in a direction similar to the direction in which the inner cylinder is rotated and $D_F/D_R$ is between about 0.3 and about 0.5, the angle ($\phi$) for the unidirectional surface lay of the inner cylinder may be less than about 90 degrees.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
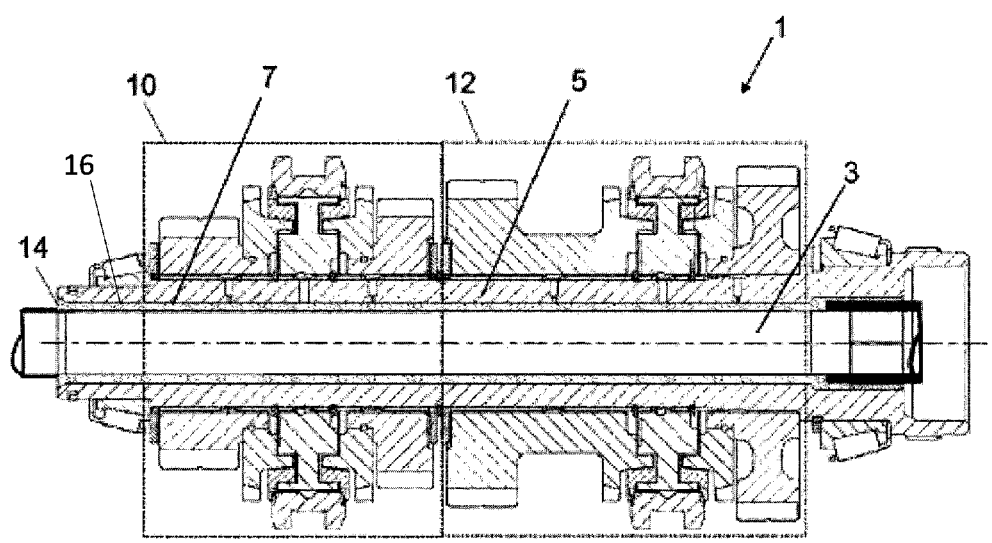
FIG. 1 is cross-sectional view of a concentric cylinder drive assembly.

The following description is merely exemplary in nature and is in no way intended to limit the present disclosure or its application or uses. It should be understood that throughout the description and drawings, corresponding reference numerals indicate like or corresponding parts and features.

One embodiment of the present disclosure provides a concentric cylinder drive assembly for transmitting power to the axles and wheels of an industrial machine, such as a tractor, or to an integrated tool assembly or implement, such as a baler or crop picker. An example of such a concentric cylinder drive assembly according to one embodiment of the present specification is shown in FIG. 1. The basic components of a concentric cylinder drive assembly 1 may include an outer cylinder 5 and an inner cylinder 3 with an annular gap 7 established between the exterior surface of the inner cylinder 3 and the interior surface of the outer cylinder 5. Multiple variations of transferring power from an engine or motor through the concentric cylinder drive assembly 1 to the main axle and wheel assembly of a tractor or to drive external accessories and implements, such as bale presses, crop pickers, etc., through integration with an arrangement of power take-off shafts and couplings.

For example, the inner cylinder 3 may be integrally connected to a power source, such as a combustion engine or motor, which can cause the cylinder to rotate. In this example, the outer cylinder 5 may be stationary. The integration of other components with the rotating inner cylinder 3 allows for the transmittance of energy to these components. In another example, the outer cylinder 5 may be integrally connected to a power source, which causes the outer cylinder 5 to rotate in either direction. The rotational torque generated may subsequently be transmitted to the inner cylinder 3 through a set of gears and couplings. The integration of other components with the rotating inner cylinder 3 allows for the transmittance of energy to these other components.

A lubrication film or layer may be added to the annular gap 7 through an inlet 14 located near one end of the concentric cylinder drive assembly 1. This lubrication film or layer is normally in the form of oil or other type of lubrication fluid known to one skilled-in-the-art of lubrication. Lubrication assists in enhancing the lifetime or longevity of the concentric cylinder drive assembly by reducing the amount of wear and tear that may occur between the inner cylinder 3 and outer cylinder 5. One skilled-in-the-art will recognize that other means of transferring lubricating oil into the annular gap is possible. For example, the inner cylinder 3 may have a hollow core with multiple holes drilled through its solid cylindrical wall or sheath that connect the hollow interior of the inner cylinder 3 with the annular gap. These holes provide a pathway to allow oil to move from the cylinder's hollow core into the annular gap 7.

In one embodiment of the present disclosure the distribution of oil along the entire length of the annular channel 7 may be controlled through the use of predetermined surface structure on the interior surface of the outer cylinder 5 and the exterior surface of the inner cylinder 3. One advantage associated with this embodiment of the specification is that the inner cylinder 3 can have a solid core instead of a hollow core. The use of an inner cylinder 3 having a solid core reduces manufacturing costs and potential fatigue problems caused by the stresses created upon drilling holes in the cylindrical wall of a hollow core cylinder.

As the lubrication oil 16 flows within the annular gap 7, a boundary layer may form on the surface of each of the concentric cylinders. The thickness of this boundary layer is dependent upon multiple factors, such as the viscosity of the oil, the structure of the cylinder's surface, and the velocity at which the fluid is flowing. This boundary layer is subject to viscous shear by the movement of the rotating inner cylinder 3. This shear may induce either laminar or turbulent flow, which reflects a balance between viscous and inertial forces and hence relates to flow instability. It is desirable to maintain flow in the laminar regime with minimal mixing between layers of oil in order to enhance lubrication. The onset of turbulence causes adjacent layers of oil to mix and may result in the formation of circular vortexes and fluctuations in flow velocity, thereby, reducing lubrication efficiency.

The structure of the exterior surface of the inner cylinder 3 and the interior surface of the outer cylinder 5 can be defined as having both a degree of roughness and a directional contour to this roughness referred to as a surface "lay". Roughness is a measurement of the small-scale variations in the height of the physical structure of the surface (e.g., peaks and valleys), while a surface lay refers to the directional line in which the peaks and valleys lie. Roughness is sometimes an undesirable property, as it may cause excessive friction, wear, drag and fatigue, between two surfaces that are in contact with each other. However, in the presence of lubrication oil, roughness may sometimes be beneficial, as its texture can allow the surfaces to trap lubricants and prevent the surfaces from welding together. Roughness is commonly calculated from measurements made using a profilometry technique and reported as an average ($R_a$) of the peak and valley distances measured along a centerline.

Figure 2:
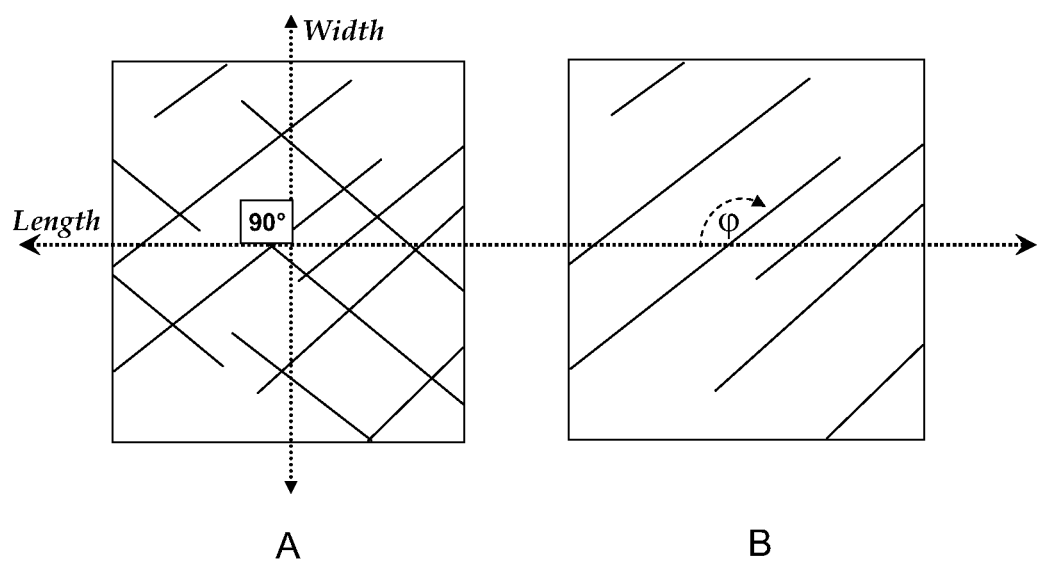
FIG. 2A is a schematic representing a type of crosshatch surface structure described as a bi-directional lay.
FIG. 2B is a schematic representing a type of unidirectional surface structure described as a unidirectional lay having an angle ($\phi$) greater than ninety degrees.

A surface lay is typically created by the type of machining operation selected and the direction in which the machining is accomplished. A surface lay may be either bi-directional or unidirectional. As shown in FIG. 2A, a bi-directional lay refers to a cross-hatch type pattern of contour lines, i.e., machine lines. This type of pattern may be created by machining the surface of a cylinder from two different directions. For example, a lathe may be used to machine the surface of a cylinder from opposite directions, thereby, creating a bi-directional lay. A unidirectional lay as shown in FIG. 2B exhibits contour or machine lines in one direction. Depending upon how the cylinder's surface is machined these contour lines can be at various angles ($\phi$) relative to the length of the cylinder. An angle ($\phi$) of 90 degrees represents contour lines in a unidirectional lay that are perpendicular to a line that is parallel to the length of the cylinder. A unidirectional lay with contour lines having an angle greater than 90 degrees is said to be forward-facing (see FIG. 2B), while a lay with contour lines having an angle less than 90 degrees is referred to as a rearward-facing, unidirectional lay. The direction of the lay may influence the direction in which the oil flows. Making a surface lay bi-directional can reduce any influence that the lay has on the direction in which the oil flows.

In one embodiment of the present specification, the interior surface of the outer cylinder 5 is machined to exhibit a bi-directional lay. The roughness of the surface may range from relatively smooth with a $R_a$ of about 0.1 micrometers to very rough with a $R_a$ of about 5.0 micrometers. However, a $R_a$ in the range of about 1.0 micrometer to about 1.6 micrometers is preferred for this surface. Although the bi-directional lay does not bias the direction of the oil flow, its surface roughness does allow the oil to grip or interact with the surface, thereby, allowing for efficient lubrication.

In one embodiment of the present specification, the exterior surface of the inner cylinder 3 is machined to exhibit a unidirectional lay. The roughness of the surface for this cylinder may range from relatively smooth with a $R_a$ of about 0.1 micrometers to very rough with a $R_a$ of about 5.0 micrometers. However, a $R_a$ in the range of about 0.8 micrometers to about 2.5 micrometers is preferred for this surface. A rougher surface is preferred in order to reduce the cost associated with the machining operation. The angle ($\phi$) associated with the unidirectional lay may affect the direction in which the oil flows.

In some applications, it may be desirable to have more oil flow towards an end of the concentric cylinder drive assembly that is more heavily integrated with components that require lubrication. Referring to FIG. 1, the concentric cylinder drive assembly 1 may be subdivided into a forward section 10 and a rearward section 12 with each section representing about ½ of the concentric cylinder drive assembly. The ratio ($D_F/D_R$) of oil distributed to the forward section ($D_F$) to the oil distributed to the rearward section ($D_R$) may range between about 0.1 to about 10.0 depending upon the number and function of components integrated with the forward 10 and rearward 12 sections. The angle (φ) of the unilateral lay may be selected to direct the oil to various sections of the concentric cylinder drive assembly 1 according to a predetermined ratio. For example, in order to achieve a distribution of oil according to a ratio of 0.7, it is desirable that the unilateral lay on the exterior of the inner cylinder 3 have an angle (φ) of about ninety degrees.

The interior side of the outer cylinder 5 and the exterior side of the inner cylinder 3 may be machined using any technique known to one skilled-in-the-art. Examples of such techniques include, but are not limited to, honing, grinding, electropolishing, lapping, polishing, mold casting, cold rolling, burnishing, reaming, electronic discharge machining (EDM), broaching, extruding, and milling.

The annular gap 7 established between the interior surface of the outer cylinder 5 and exterior surface of the inner cylinder 3 may range from about 0.5 mm to about 5.0 mm with the range of about 2.5 to 3.5 mm being preferred. The annular gap is relatively constant over the entire length of the concentric cylinder drive assembly 1 in order to reduce the possibility that the drive assembly may act as a pump and also to facilitate laminar flow of the oil throughout the entire annular gap 7.

The lubrication oil may be any fluid known to one skilled-in-the-art of lubrication. Examples of lubricating fluids include, but are not limited to, multi-grade engine oils, synthetic engine oils, mineral oils, and polyalphaolefins. The lubrication oil may also include other performance additives, such as high molecular weight thickeners and viscosity index improvers.

The following specific examples are given to illustrate the invention and should not be construed to limit the scope of the invention.

and a forward-facing, unidirectional surface lay. The outer cylinder 5 is rotated at various speeds in both a clockwise and counter clockwise (e.g., indicated by a negative speed) direction. The inner cylinder 3 has an outer diameter of 24 mm, thereby establishing an annular gap 7 of 2.5 mm. The inner cylinder 3 has an average surface roughness ($R_a$) of 4.33 micrometers and a rearward-facing, unilateral surface lay. The inner cylinder is rotated at various speeds in the clockwise direction. Oil is provided into the annular gap 7 at an inlet 14 located at one end of the concentric cylinder drive assembly 1. The oil pressure and the oil flow rate are varied during the experiment. The oil temperature was maintained at 30 degrees Celsius. The amount of oil distributed to the forward section 10 and rearward section 12 is collected and measured. The ratio ($D_F/D_R$) for the amount of oil in the forward section 10 to the rearward section 12 was then calculated.

The various parameters and conditions varied through out the experiment, along with the resulting $D_F/D_R$ ratio are shown in Table 1 below. Under all experimental conditions employed the $D_F/D_R$ ratio seldom was observed to approach the target ratio of 0.7. This example demonstrates that a concentric cylinder drive assembly 1 with an outer cylinder 5 having a forward-facing, unidirectional surface lay and an inner cylinder 3 with a rearward-facing, unidirectional surface lay are not a satisfactory combination to meet a target $D_F/D_R$ ratio of about 0.7 independent of the outer cylinder's speed (magnitude and direction), inner cylinder speed, oil pressure and oil flow rate. In fact the broad range established for $D_F/D_R$ in this experiment, e.g., 0.97 (run 1-3) to 1.95 (run 1-5), indicates that this combination would not approach any specific ratio independent of the parameters varied in the experiment.

TABLE 1

|  | 1-1 | 1-2 | 1-3 | 1-4 | 1-5 | 1-6 |
| --- | --- | --- | --- | --- | --- | --- |
| Varied Parameters |  |  |  |  |  |  |
| Outer Cylinder Speed (rpm) | 2644 | −2424 | 0 | 2200 | 2200 | 900 |
| Inner Cylinder Speed (rpm) | 2200 | 2200 | 2200 | 2200 | 2200 | 900 |
| Oil Pressure at inlet (bar) | 3 | 3 | 3 | 1 | 0.6 | 0.3 |
| Oil Flow Rate at Inlet (ml/s) | 160 | 160 | 160 | 75 | 55 | 20 |
| Measured Output |  |  |  |  |  |  |
| Fwd to Rwd Ratio (Target ~0.7) | 1.42 | 1.44 | 0.97 | 1.77 | 1.95 | 1.51 |

EXAMPLE 1

Basic Experimental Set-up

A concentric cylinder drive assembly 1 as shown in FIG. 1 is utilized to determine the ratio ($D_F/D_R$) of oil distributed between the forward section 10 and the rearward section 12 under various conditions with a ratio of 0.7 being the target or goal. The outer cylinder 5 has an inner diameter of 29 mm with an interior surface roughness ($R_a$) of 1.6 micrometers

EXAMPLE 2

Reduced Surface Roughness

The experimental set-up described in Experiment 1 was rerun with an inner cylinder 3 having a reduced average surface roughness ($R_a$) of about 0.8 micrometers. The parameters and conditions varied through out the experiment along with the resulting distribution ratio ($D_F/D_R$) are shown in Table 2 below.

TABLE 2

|  | 2-1 | 2-2 | 2-3 | 2-4 | 2-5 | 2-6 |
| --- | --- | --- | --- | --- | --- | --- |
| Varied Parameters |  |  |  |  |  |  |
| Outer Cylinder Speed (rpm) | 2644 | −2424 | 0 | 2200 | 2200 | 900 |
| Inner Cylinder Speed (rpm) | 2200 | 2200 | 2200 | 2200 | 2200 | 900 |

TABLE 2-continued

|  | 2-1 | 2-2 | 2-3 | 2-4 | 2-5 | 2-6 |
|---|---|---|---|---|---|---|
| Oil Pressure at inlet (bar) | 3 | 3 | 3 | 1 | 0.6 | 0.3 |
| Oil Flow Rate at Inlet (ml/s) | 160 | 160 | 160 | 75 | 55 | 20 |
| Measured Output |  |  |  |  |  |  |
| Fwd to Rwd Ratio (Target ~0.7) | 1.09 | 0.79 | 0.81 | 1.57 | 1.54 | 1.60 |

Under most experimental conditions employed the $D_F/D_R$ ratio seldom was observed to approach the target ratio of 0.7. Only when the outer cylinder was either rotated in a counterclockwise direction (run 2-2) or held stationary (run 2-3), was the target ratio approached. This example demonstrates that a concentric cylinder drive assembly 1 with an outer cylinder 5 having a forward-facing, unidirectional surface lay and an inner cylinder 3 with a rearward-facing, unidirectional surface lay are not a satisfactory combination to meet a target ratio of about 0.7 independent of the outer cylinder's speed (magnitude and direction), inner cylinder speed, oil pressure, and oil flow rate. In fact the range in ratios obtained from 0.79 (run 2-2) to 1.60 (run 2-6) indicates that this combination would not approach any specific ratio independent of the parameters varied in the experiment. Reducing the average roughness $R_a$ of the cylinder was shown to have only a mild affect on improving the ability of the drive assembly to approach the target ratio.

EXAMPLE 3

Bi-directional Lay on Outer Cylinder

The experimental set-up described in Experiment 1 was rerun with an outer cylinder 5 having a bi-directional surface lay and an average surface roughness ($R_a$) of about 1.2 micrometers. The inner cylinder 3 had a rearward-facing, unidirectional surface lay and an average surface roughness ($R_a$) of about 0.8 micrometers. The parameters and conditions varied through out the experiment along with the resulting distribution ratio ($D_F/D_R$) are shown in Table 3 below.

TABLE 3

|  | 3-1 | 3-2 | 3-3 | 3-4 | 3-5 | 3-6 | 3-7 |
|---|---|---|---|---|---|---|---|
| Varied Parameters |  |  |  |  |  |  |  |
| Outer Cylinder Speed (rpm) | 2644 | −2424 | 0 | 2200 | 2200 | 900 | 0 |
| Inner Cylinder Speed (rpm) | 2200 | 2200 | 2200 | 2200 | 2200 | 900 | 900 |
| Oil Pressure at inlet (bar) | 3 | 3 | 3 | 1 | 0.6 | 0.3 | 1 |
| Oil Flow Rate at Inlet (ml/s) | 160 | 160 | 160 | 75 | 55 | 20 | 60 |
| Measured Output |  |  |  |  |  |  |  |
| Fwd to Rwd Ratio (Target ~0.7) | 0.34 | 1.06 | 0.53 | 0.51 | 0.40 | 0.30 | 0.58 |

Under the experimental conditions employed the $D_F/D_R$ ratio seldom was observed to approach the target ratio of 0.7. Only in run 3-7, where the outer cylinder was rotated at a relatively low speed, was the target ratio approached. This example demonstrates that a concentric cylinder drive assembly 1 with an outer cylinder 5 having a bi-directional surface lay and an inner cylinder 3 with a rearward-facing, unidirectional surface lay are not a satisfactory combination to meet a target ratio of about 0.7 independent of the outer cylinder's speed (magnitude and direction), inner cylinder speed, oil pressure and oil flow rate. However, under most experimental conditions this combination was found to approach a $D_F/D_R$ ratio of about 0.3 to 0.5. The only condition under which this $D_F/D_R$ ratio was not approached was when the outer cylinder was run in a counterclockwise direction (run 3-2). Thus a bi-directional lay on the interior surface of the outer cylinder 5 can be used in combination with a rearward-facing, unidirectional lay on the exterior surface of the inner cylinder 3 to direct an oil distribution towards a ratio of 0.3 to 0.5. This example demonstrates that a bi-directional lay on the interior surface of the outer cylinder 5 reduces any affect that this surface may have on the direction of oil flow. Furthermore, the direction of oil flow may be affected by the use of a unidirectional lay on the exterior surface of the inner cylinder 3.

EXAMPLE 4

Unidirectional Lay with an Angle ($\phi$) of about 90°

The experimental set-up described in Experiment 1 was rerun with an outer cylinder 5 having a bi-directional surface lay and an average surface roughness ($R_a$) of about 1.2 micrometers. The inner cylinder 3 has a perpendicular-facing, unidirectional surface lay with an angle ($\phi$) of about ninety degrees and an average surface roughness ($R_a$) of about 0.8 micrometers. The parameters and conditions varied through out the experiment along with the resulting distribution ratio ($D_F/D_R$) are shown in Table 4 below. In two of the runs, run 4-5 and run 4-6, the oil temperature was increased from 30 degrees Celsius to 60 degrees Celsius.

TABLE 4

|  | 4-1 | 4-2 | 4-3 | 4-4 | 4-5 | 4-6 |
|---|---|---|---|---|---|---|
| Varied Parameters |  |  |  |  |  |  |
| Outer Cylinder Speed (rpm) | 2644 | −2424 | 0 | 2200 | 2200 | 900 |
| Inner Cylinder Speed (rpm) | 2200 | 2200 | 2200 | 2200 | 2200 | 900 |

TABLE 4-continued

|  | 4-1 | 4-2 | 4-3 | 4-4 | 4-5 | 4-6 |
|---|---|---|---|---|---|---|
| Oil Pressure at inlet (bar) | 2.1 | 2.1 | 2.1 | 1.7 | 1.7 | 1.7 |
| Oil Flow Rate at Inlet (ml/s) | 140 | 140 | 140 | 120 | 175 | 70 |
| Measured Output |  |  |  |  |  |  |
| Fwd to Rwd Ratio (Target ~0.7) | 0.65 | 0.82 | 0.78 | 0.7 | 0.6 | 0.8 |

Under all of the experimental conditions employed, the measured $D_F/D_R$ ratio was found to approach the targeted ratio of 0.7. Thus this example demonstrates that an outer cylinder with a bi-directional surface lay and an inner cylinder with a perpendicular-facing, unidirectional surface lay having an angle ($\phi$) of about ninety degrees is a satisfactory combination to meet a target ratio of about 0.7 independent of the outer cylinder's speed (magnitude and direction), inner cylinder speed, oil pressure, and oil flow rate.

EXPERIMENT 5

Increased Surface Roughness

The experimental set-up described in Experiment 4 was rerun with an inner cylinder 3 having an average surface roughness ($R_a$) of about 2.5 micrometers. The parameters and conditions varied through out the experiment along with the resulting distribution ratio ($D_F/D_R$) are shown in Table 5 below.

TABLE 5

|  | 5-1 | 5-2 | 5-3 | 5-4 |
|---|---|---|---|---|
| Varied Parameters |  |  |  |  |
| Outer Cylinder Speed (rpm) | 2644 | 2200 | −2424 | 0 |
| Inner Cylinder Speed (rpm) | 2200 | 2200 | 2200 | 2200 |
| Oil Pressure at inlet (bar) | 2.1 | 2.1 | 2.1 | 2.1 |
| Oil Flow Rate at Inlet (ml/s) | 140 | 140 | 140 | 140 |
| Measured Output |  |  |  |  |
| Fwd to Rwd Ratio (Target ~0.7) | 0.69 | 0.70 | 0.85 | 0.83 |

Under all of the experimental conditions employed, the measured ratio was found to approach the targeted ratio of 0.7. Thus this example demonstrates that an outer cylinder with a bi-directional surface lay and an inner cylinder with a perpendicular-facing, unidirectional surface lay having an angle ($\phi$) of about ninety degrees is a satisfactory combination to meet a target ratio of about 0.7 independent of the outer cylinder's speed (magnitude and direction), inner cylinder speed, oil pressure, and oil flow rate. The surface roughness of the inner cylinder may be increased with no effect observed on being able to obtain the targeted ratio.

A person skilled in the art will recognize from the previous description that modifications and changes can be made to the present disclosure without departing from the scope of the disclosure as defined in the following claims. The test method described in the examples represents only one available method to obtain the required measurements.

What is claimed is:

1. A concentric cylinder drive assembly used for the transmission of power in industrial machinery, the concentric drive assembly comprising:
    a hollow outer cylinder having an internal surface with a bi-directional surface lay;
    an inner cylinder having an external surface with a unidirectional surface lay oriented at a predetermined angle ($\phi$) along the length of the cylinder;
    an annular channel established between the outer and inner cylinders having a predetermined gap; and
    a lubrication oil that substantially fills the annular channel;
    wherein said inner cylinder is configured to be rotated in one direction, thereby subjecting the lubrication oil to a laminar flow condition.

2. The concentric drive assembly of claim 1, wherein the gap of the annular channel is selected as one between the range of about 0.5 mm to about 5.0 mm.

3. The concentric cylinder drive assembly of claim 2, wherein the gap of the annular channel is selected as one between the range of about 2.5 mm to about 3.5 mm.

4. The concentric cylinder drive assembly of claim 1, wherein the inner cylinder has a solid core.

5. The concentric cylinder drive assembly of claim 4, wherein the lubrication oil enters the annular gap at one end of the concentric cylinders.

6. The concentric cylinder drive assembly of claim 1, wherein the inner cylinder has a hollow core and a cylindrical wall.

7. The concentric cylinder drive assembly of claim 6, wherein the lubrication oil enters the annular gap through multiple holes drilled through the cylindrical wall of the inner cylinder into its hollow core.

8. The concentric cylinder drive assembly of claim 1, wherein the outer cylinder is stationary.

9. The concentric cylinder drive assembly of claim 1, wherein the outer cylinder is configured to be rotated.

10. The concentric cylinder drive assembly of claim 1, wherein the unidirectional surface lay of the inner cylinder is a forward-facing lay having an angle ($\phi$) greater than about 90 degrees.

11. The concentric cylinder drive assembly of claim 1, wherein the unidirectional surface lay of the inner cylinder is a rearward-facing lay having an angle ($\phi$) less than about 90 degrees.

12. The concentric cylinder drive assembly of claim 1, wherein the unidirectional surface lay on the inner cylinder is a perpendicular-facing lay having an angle ($\phi$) of about 90 degrees.

13. The concentric cylinder drive assembly of claim 1, wherein the interior surface of the outer cylinder and the exterior surface of the inner cylinder have an average surface roughness ($R_a$) within the range of about 0.5 micrometers to about 5.0 micrometers.

14. The concentric cylinder drive of claim 13, wherein the interior surface of the outer cylinder has an average surface roughness ($R_a$) within the range of about 1.0 micrometers to about 1.6 micrometers.

15. The concentric cylinder drive of claim 13, wherein the exterior surface of the inner cylinder has an average surface roughness ($R_a$) within the range of about 0.8 micrometers to about 2.5 micrometers.

16. A concentric cylinder drive assembly used for the transmission of power in industrial machinery, the concentric drive assembly comprising:
- a forward section;
- a rearward section;
- a hollow outer cylinder running substantially through both the forward and rearward sections and having an internal surface with a bi-directional surface lay;
- an inner cylinder running substantially through both the forward and rearward sections and having an external surface with a unidirectional surface lay oriented at a predetermined angle ($\phi$) along the length of the cylinder;
- an annular channel established between the outer and inner cylinders; and
- a lubrication oil that substantially fills the annular channel;
- wherein said inner cylinder is configured to be rotated in one direction subjecting the lubrication oil to a laminar flow condition; and
- wherein the distribution of lubrication oil between the forward and rearward sections is determined according to a predetermined $D_F/D_R$ ratio.

17. The concentric cylinder drive assembly of claim 16, wherein the angle ($\phi$) for the unidirectional surface lay of the inner cylinder is about 90 degrees.

18. The concentric cylinder drive assembly of claim 17, wherein the $D_F/D_R$ ratio is 0.7.

19. The concentric cylinder drive assembly of claim 16, wherein the outer cylinder is configured to be rotated in a similar direction as the rotation of the inner cylinder.

20. The concentric cylinder drive assembly of claim 19, wherein the angle ($\phi$) for the unidirectional surface lay of the inner cylinder is less than about 90 degrees.

21. The concentric cylinder drive assembly of claim 20, wherein the $D_F/D_R$ ratio is between about 0.3 to about 0.5.

* * * * *